(No Model.)
J. F. PALMER.
FABRIC.
No. 493,220.    Patented Mar. 7, 1893.
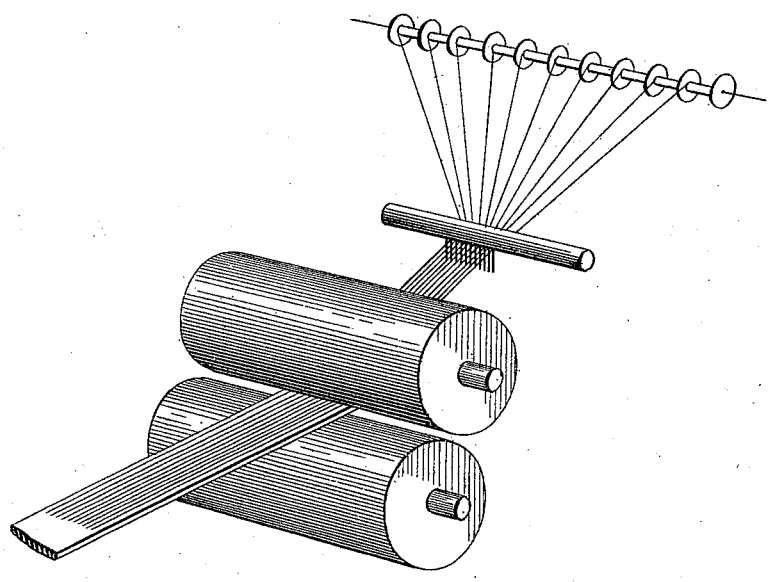
Witnesses:
Chas. E. Gaylord.
Jno. A. Christianson.
Inventor:
John F. Palmer,
By Douglas Dyrenforth
his atty.

UNITED STATES PATENT OFFICE.

JOHN FULLERTON PALMER, OF RIVERSIDE, ASSIGNOR TO THE PALMER PNEUMATIC TIRE COMPANY, OF CHICAGO, ILLINOIS.

FABRIC.

SPECIFICATION forming part of Letters Patent No. 493,220, dated March 7, 1893.

Application filed November 17, 1892. Serial No. 452,339. (No specimens.)

*To all whom it may concern:*

Be it known that I, JOHN FULLERTON PALMER, a citizen of the United States, residing at Riverside, in the county of Cook and State of Illinois, have invented a new and useful Improvement in Fabrics, of which the following is a specification.

My invention relates to an improvement in fabric made up in part of fibrous or similar flexible threads, and more particularly to such a fabric which employs in its composition rubber or other similar material in its nature impervious to moisture or in its nature elastic, and especially to a fabric of this character composed in part of fibrous or similar flexible threads, and in part of a material in its nature elastic and impervious to moisture and capable of vulcanization.

In the manufacture of rubber cloth as heretofore produced it has been the usual practice, first, to produce a woven fabric made up of threads interwoven and hence crossing each other, which fabric has been saturated with soft rubber gum and subsequently subjected to the act of vulcanization to produce a practically homogeneous material. Sometimes the product has been made by placing a sheet of woven fabric upon a sheet of rubber or between two sheets of rubber or upon both sides of the sheet of rubber and thereupon to vulcanize the parts together. In any method heretofore employed, so far as I am aware however, for producing a rubber fabric a woven sheet of material has been employed, and it is the object of my invention, primarily, to produce a fabric which shall be made up of flexible threads which are not interwoven but are held together by the rubber or equivalent material employed therewith. Where a material made up of interwoven threads is used under conditions involving a vibration of its texture, as for instance, where it is employed as a covering for hose, belting, bicycle tubing, washers and such like uses, it is found that the contact of the threads with each other causes a species of sawing or cutting action one against the other which results in the severance of the threads. Such severance minute at first soon results in the destruction of the fabric, and it has been ascertained that where the vibration to which the fabric is subjected is rapid and continuous, as in the case of belting, bicycle tires, &c., the destruction from this cause occurs so soon as materially to reduce the value of the product for this use.

A further object of my invention is to produce a fabric which shall be substantially non-stretching in one direction while it is capable of stretching to a considerable degree in another.

A further object of my invention is to produce a fabric which shall be non-stretching in two directions and capable of stretching in another.

A further object of my invention is to produce a fabric which shall be as light as one made of an interwoven sheet saturated with or laid upon rubber, the threads in which shall however be kept out of contact with each other.

To these ends my invention consists in a fabric composed of substantially parallel threads of flexible material substantially out of contact with each other, and held together by an elastic or impervious material, such as rubber, preferably vulcanized.

Otherwise expressed my invention consists in a fabric comprising a sheet of rubber or similar material having embedded therein substantially parallel flexible threads substantially out of contact with each other.

My invention consists further in a fabric composed of threads arranged in two or more series each series held out of contact with the other by an interposed rubber or similar material and the threads in each series being arranged substantially parallel and substantially out of contact with each other and held together by the rubber or similar material.

My invention consists further in a fabric composing two or more layers arranged at an angle to each other, each layer comprising substantially parallel threads of flexible material substantially out of contact with each other, the threads in each layer as well as the two layers being held together and kept out of contact by interposed rubber or similar material.

To produce the fabric herein described I prefer to employ an ordinary calendering machine for calendering rubber, arranged in connection with which upon suitable supports are spools carrying threads of flexible material, such as linen, the threads from which are fed between the rollers in parallel lines to be by these rollers embedded in the rubber. It is usual to supply the rubber with ingredients for vulcanizing, and the act of vulcanizing causes the threads to become practically homogeneous with the rubber sheet.

I do not claim any particular apparatus to carry out this invention as it is quite obvious that any form of calendering apparatus may be employed, and any convenient way of feeding the threads to the sheet while passing through the calendering machine will serve the purpose. I have produced with perfect success a fabric answering the conditions of my invention by feeding the threads to the sheet of rubber by hand, and this method may be employed if desired.

The drawing is a diagrammatic illustration of a pair of calendering rolls showing the sheet of rubber passing through the same and showing a series of spools arranged to carry a sufficient number of threads to permit the embedding in the sheet of threads about one thirty-second of an inch apart; but the distance between the threads may be greater or less without departing from my invention.

To produce the fabric herein described I proceed as follows: The rubber or similar material is passed through calendering rolls and during its passage there are fed thereto to be pressed and thus embedded therein threads of flexible material, preferably linen, and the sheet is thereupon vulcanized. The threads are caused to lie substantially parallel with each other without being in contact, although it will in no sense detract from the material benefits of the invention if the threads do lie in contact with each other laterally. Before vulcanizing a similar feeding of threads to the sheet may take place on the reverse side either by passing the sheet again through calendering rolls, or by causing the threads to be fed thereto on both sides during its forward movement. I prefer, however, to apply the threads to one side of the sheet only. Another sheet similarly produced may before either is vulcanized be laid at a right-angle or another angle upon the sheet first produced in such a manner that the threads of one are kept out of contact with the threads of the other by an interposed layer or layers of rubber. The product being vulcanized will be incapable of stretching longitudinally of either set of threads if the threads themselves be non-stretching, or if they be extensible to a certain degree the extensibility of the fabric will be limited to the extensibility of the fibers. Transversely of the threads, or, where two sets are arranged at an angle to each other, in a direction intermediate of the longitudinal and transverse direction of either, the fabric may be stretched to the limits permitted by the elasticity of the rubber or similar material, with the advantage, that, after thus stretching, the fabric will return on release to its former condition. Substantially to prevent stretching in any direction the number of layers may be increased, each being applied at an angle to all the others. Thus by carrying out my invention a fabric may be obtained incapable of stretching longitudinally but stretchable in all other directions, or incapable of stretching in any direction, or having properties of stretching and non-stretching between these two. In applying such a fabric to tubes, which may be done either by applying in the form of crossed diagonal strips as described in my pending application Serial No. 442,545, filed August 9, 1892, or in the usual manner of applying canvas, to-wit, in the form of a single strip cut diagonally of the fibers, the tendency to stretch either longitudinally or transversely will, by the tension upon the other direction, be, after a certain limit, entirely counteracted; and if the longitudinal or transverse stretching shall first be performed to the full limit then the stretching in the other, namely, transverse or longitudinal direction, will be substantially prevented.

In speaking of the stretching and non-stretching property there is meant approximately this quality as it is found in commercial products. Thus, although no fibrous material may properly be called absolutely non-stretching, certain grades of linen thread are called non-stretching, because the amount of extensibility is necessarily very small. So certain kinds of impervious material and rubber if vulcanized in certain ways can be stretched very little, and yet compared with linen thread it may be called extensible.

The terms stretching and non-stretching herein employed are to be accepted in their commercial signification.

What I claim as new, and desire to secure by Letters Patent, is—

1. A fabric made of elastic and impervious material, such as rubber, having embedded within the surface threads substantially out of contact with each other, as described.

2. A fabric made of elastic and impervious material, having embedded and vulcanized therein substantially parallel fibrous threads, as described.

3. A fabric made of vulcanized elastic and impervious material having embedded and vulcanized therein, substantially parallel, fibrous and non-extensible threads, as described.

4. A fabric made of rubber or analogous elastic and impervious material, having embedded in each surface threads substantially out of contact with each other, as described.

5. A fabric made of two or more plies of rubber, each having embedded therein parallel fibrous threads, the threads in one ply being out of contact with and presenting an angle to the threads of the other.

6. A fabric made of two or more plies of rubber, each ply having embedded and vulcanized therein substantially non-extensible parallel fibrous threads, out of intimate contact with each other, the threads in adjacent plies presenting an angle to each other.

7. The method of producing a fabric, which consists in calendering rubber, and in the act of calendering feeding thereto and embedding therein substantially parallel and non-extensible threads of flexible material, such as linen, applying together two such sheets in such manner that the threads of one are kept out of contact with the threads of the other by interposed rubber, and thereupon vulcanizing the product, substantially as described.

8. The method of producing a fabric, which consists in calendering rubber, and during the act of calendering feeding thereto and embedding therein substantially parallel fibrous threads, applying one such sheet to another in such manner that the threads of one present an angle to the threads of the other and are kept out of contact therewith by interposed rubber, and thereupon vulcanizing, substantially as described.

JOHN FULLERTON PALMER.

In presence of—
M. J. FROST,
J. N. HANSON.